United States Patent
Arrufat Ribas

(10) Patent No.: US 11,315,374 B2
(45) Date of Patent: Apr. 26, 2022

(54) DETECTION OF FRAUDULENT ACCESS AT CONTROL GATES

(71) Applicant: HOLDING ASSESSORIA I LIDERATGE, S.L. (HAL SL), Barcelona (ES)

(72) Inventor: Francesc Xavier Arrufat Ribas, Barcelona (ES)

(73) Assignee: Holding Assessoria I Lideratge, S.L., Barcelona (ES)

(*) Notice: Subject to any disclaimer, the term of this patent is extended or adjusted under 35 U.S.C. 154(b) by 822 days.

(21) Appl. No.: 16/071,160

(22) PCT Filed: Jan. 20, 2017

(86) PCT No.: PCT/EP2017/051143
§ 371 (c)(1),
(2) Date: Jul. 19, 2018

(87) PCT Pub. No.: WO2017/133902
PCT Pub. Date: Aug. 10, 2017

(65) Prior Publication Data
US 2021/0209883 A1     Jul. 8, 2021

(30) Foreign Application Priority Data

Feb. 4, 2016   (EP) .................................... 16382047

(51) Int. Cl.
*G07C 9/15*   (2020.01)
*G07C 9/28*   (2020.01)
*G06V 20/13*  (2022.01)
*G06V 20/52*  (2022.01)
*G06V 20/64*  (2022.01)

(52) U.S. Cl.
CPC .............. *G07C 9/15* (2020.01); *G06V 20/13* (2022.01); *G06V 20/53* (2022.01); *G06V 20/64* (2022.01); *G07C 9/28* (2020.01)

(58) Field of Classification Search
CPC ........ G07C 9/15; G07C 9/28; G06K 9/00201; G06K 9/00778
See application file for complete search history.

(56) References Cited

U.S. PATENT DOCUMENTS

| | | | |
|---|---|---|---|
| 5,809,161 A | 9/1998 | Auty et al. | 382/104 |
| 7,382,895 B2 | 6/2008 | Bramblet et al. | 382/103 |
| 2002/0121961 A1* | 9/2002 | Huff | G07C 9/20 340/5.3 |
| 2004/0027242 A1 | 2/2004 | Venetianer et al. | 340/555 |

(Continued)

FOREIGN PATENT DOCUMENTS

| | | |
|---|---|---|
| EP | 1833002 | 9/2007 |
| WO | WO 96/38820 | 12/1996 |

(Continued)

*Primary Examiner* — Vernal U Brown
(74) *Attorney, Agent, or Firm* — Fattibene and Fattibene LLC; Paul A. Fattibene

(57) ABSTRACT

A method for detecting tailgating of subjects and/or objects at gates by measuring the occultation of a reference occulted by a subject and/or an object passing through the gate A time series based on the measured occultation is generated and a parameter from the generated time series is determined for characterization of the subject and/or the object passing through the gate.

14 Claims, 5 Drawing Sheets

(56) References Cited

U.S. PATENT DOCUMENTS

Figure 1:
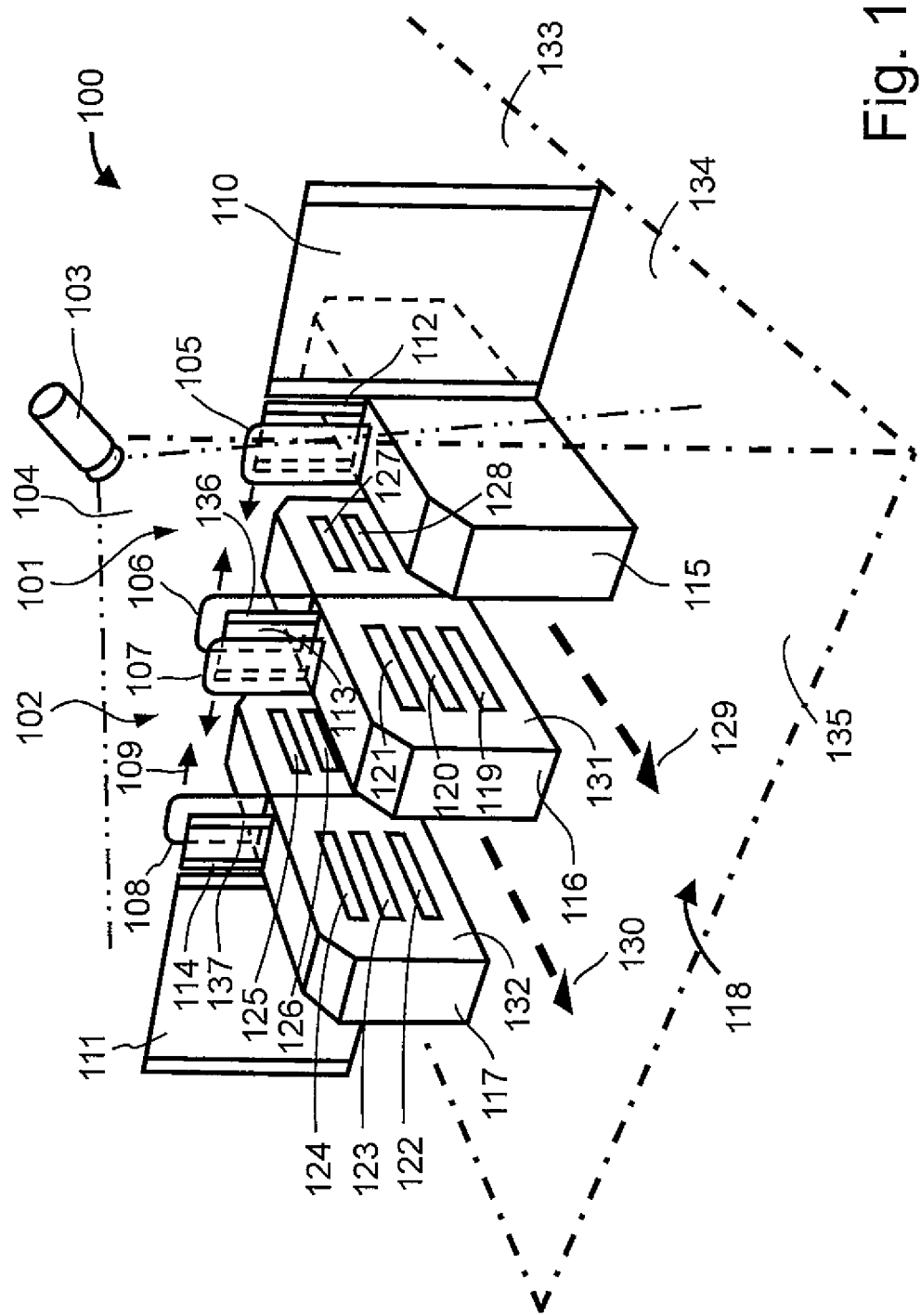

2005/0104727 A1    5/2005  Han et al. .................... 340/541
2009/0167857 A1*   7/2009  Matsuda ................. G07C 9/00
                                                        348/143

FOREIGN PATENT DOCUMENTS

WO      WO 03088157       10/2003
WO      WO 2011/018078     2/2011

* cited by examiner

DETECTION OF FRAUDULENT ACCESS AT CONTROL GATES

STATE OF THE ART

The invention relates to a method for detecting tailgating of subjects and/or objects at gates, a storage media having stored therein instructions that when executed perform a method for detecting tailgating of subjects and/or objects at gates, and a system for detecting tailgating of subjects and/or objects at gates.

Tailgating or piggybacking, herein referring to a fraudulent or illegal access event wherein for example two subjects or two objects attempt to pass a control gate at the same time and wherein only one subject or object at a given time is allowed to pass, is a widespread problem in gate control and gate security.

A typical example of such kind of fraudulent access is for instance the case of one or more subjects attempting to pass a control gate taking advantage of the safety delay in the gate closure after a previous paying subject has passed.

Current systems and techniques to monitor control gates often suffer from low accuracy or are too complicated and too cost intensive, inter alia involving complex 3D imaging systems, such as for example described in WO 03/088157 A1.

Problem

It is therefore the object of the present invention to improve a method and system for detecting fraudulent access, e.g. tailgating, of subjects and/or objects at control gates. For example, this may comprise improving a method and system for detecting fraudulent access in particular with respect to efficiency, reliability and simplicity.

Solution

According to the present invention, this object is achieved by a method, a storage media, and a system. Advantageous embodiments and further developments are the subject matter of the additional features disclosed.

The term occultation is inter alia herein to be understood as comprising the term occlusion and wherein for example a subject and/or object passing a gate blocks/block from view of an observer or detector a reference or a plurality of references, i.e. wherein for example the gate passing subject and/or object blocks/block the reference(s) from view of a camera or a plurality of cameras.

Furthermore, the term occultation of a reference can comprise occultation of parts of the reference or occultation of the whole reference, and can comprise a transient occultation of a reference, wherein the reference is occulted to varying degree, i.e., for example, wherein different parts, e.g. different surface areas, of the reference are occulted at different times.

The term reference as used herein can inter alia be understood as a reference surface, a plurality of reference surfaces, a reference point or a plurality of reference points, wherein for example a plurality of reference points can be considered as single reference points or as forming a reference set of reference points, for example a reference grid of reference points.

A method according to the invention for detecting tailgating of subjects and/or objects at gates or gate systems can inter alia comprise one or some or all of the following steps:

- measuring the occultation of at least one reference occulted by at least one subject and/or at least one object passing through at least one gate
- generating at least one time series based on the measured occultation
- determining at least one parameter from the at least one generated time series for characterization of the at least one subject and/or at least one object passing through at least one gate.

Therein, the measuring of the occultation of at least one reference occulted by at least one subject and/or at least one object passing through at least one gate, for example, can be carried out by at least one camera configured for capturing single image frames and/or a stream of image frames, e.g. a video stream.

This for example can allow for a faster, simpler and more efficient way of detecting tailgating of subjects and/or objects at gates as compared to conventional methods. Furthermore this can allow real-time detection of tailgating of subjects and/or objects at control gates.

In addition, such a method can, for example, also provide metrics to measure the flow of subjects and/or objects passing through at least one gate, such as for example a count of the number of subjects and/or objects passing through the at least one gate and/or measures of the time intervals between consecutive subjects and/or objects passing through the at least one gate. Together with the count of illegal passes, this can, for example, allow to compute for instance fraud rates, as the number of illegal passes over the total number of passes, as a tool for better management and monitoring.

In particular, the invention for example further allows the measurement of the occultation of the at least one reference occulted by at least subject and/or at least one object passing through at least one gate to be carried out by using only a single camera.

Thereby a plurality of gates and therefore a plurality of different subject and/or object flows, i.e. different subject and/or object streams, for example different subject and/or object streams associated to different gates, can be controlled at the same time and by using only a single camera.

Any part or surface of a/the gate or a/the gate environment may serve as a reference, as long as said part lies in the line of sight to the detector, e.g. a camera, respectively lies in the field of view of the detector, and as long as the to be observed subjects or objects have to cross this line of sight or field of view in a way that occults at least parts of the used reference.

For example a camera or a plurality of cameras can be configured and positioned such that a subject and/or object passing a gate to be monitored will, for practically all possible relative orientation geometries between camera(s), reference(s) and passing subject or object, occult at least parts of the used reference(s).

In other words, from the perspective of a detector, e.g. a camera, configured for measuring the occultation of at least one reference occulted by at least one subject and/or at least one object passing through at least one gate, the reference can be understood as a background object or background reference that is occulted by a foreground subject or foreground object crossing the line of sight between the detector and the reference.

It is worthwhile noting that it is sufficient for a method or system according to the invention to work, that only a part of the subject or object occults the reference. For example it is sufficient that only the occultation of the reference by the upper part of a subject, for example from the waist up of a subject/a person, is measured.

As a suitable reference, a fixed or moveable part of a/the gate and/or a part of a/the gate environment, such as for example a wall, a ceiling, or a floor, e.g. the floor of a control zone of a/the gate or the surrounding walls, can be used.

Any fixed part of a gate or any surface of a gate that can be occulted by a subject or object passing the gate can be used, such as for example the supporting structure of gate doors or turnstiles or fixed separators or fixed gate walls or gate pillars or gate enclosures.

A further example of a suitable reference could be an edge part of a gate, for example an edge of a fixed separator. For example, an edge of a fixed separator may serve as a strip-like reference that can be substantially parallel to the direction of gravity.

Furthermore, for example, the thinner a reference the better a passing subject or object occulting at least partially said reference may be resolved, i.e. the better the precision of the system for detecting tailgating of subjects and/or objects at gates.

For example, on the detector, e.g. a pixel matrix of a charge-coupled device (CCD) of a camera, a reference may cover a column or row with a width of equal or less than four (raw) pixels. However, widths greater than 4 pixels are acceptable too.

By applying a weighted averaging, for a example a Gaussian filter, to pixels covering the reference, meaning that for example the value of a pixel is corrected by the value of its neighboring pixels, the color stability of pixels covering the reference can be improved.

Alternatively or additionally the scale of an image frame recorded by the detector, e.g. by the camera, can be altered. For example the scale of an image frame can be reduced by binning of pixels, for example, a frame scale could be reduced by a factor of 2 by replacing every square made of four pixels by a single square that is the average of said previous 4 pixels, thereby stabilizing the derived pixel in the reduced image frame.

In addition, if need be, references can be artificially extended by analysis algorithms, to further improve the measurement of the occultation of at said references occulted by a subject or object passing through a gate.

Also an area delimited by fixed parts, for example delimited by fixed separators or parts thereof can be used as reference(s).

Even details of the surfaces of said parts such as for example enclosures, seams, bolts, displays, slits or the like or parts thereof may serve as a reference/as references.

It is also possible that any moveable part of the gate or any moveable surface of the gate that can be occulted by a subject or object passing the gate can be used.

For example the surface of a moving gate door or parts thereof, e.g. an edge of a moving gate doors, can be used as reference. For example the measuring of the occultation may be carried out only when the moving gate doors are open and an edge of a moving gate door is visible to the detector, e.g. the camera, measuring the occultation by a subject or object passing the gate via the open moving gate door(s).

Further it is conceivable that any combination of said fixed or moveable parts or surfaces can serve as a reference.

It is further possible that a reference or a plurality of references can be attached to a fixed or moveable part of a gate and/or attached to a part of a gate environment, e.g. to the floor or to surrounding walls, and can be used as a reference/as references.

For example a reference or a plurality of references could be attached to a fixed or moveable part of a gate or a gate environment by bonding means, such as for example adhesives, screws, bolts and the like. For example the reference could be a sticker or a plurality of stickers attached to a fixed or moveable part of a gate or a gate environment.

For example of a suitable reference could be attached to fixed edge part of a gate, for example, an edge of a fixed separator.

However, as indicated previously, any part(s) of a gate or gate environment that can get at least partially occulted by a passing subject/object can serve as a reference regardless of the shape of the part(s) of the gate or gate environment used as reference(s).

In other words, the shape and/or orientation of the references described above, in particular the shape of the attachable references, can practically be chosen freely and may comprise for example rectangular shapes, trapezoidal, curved, or even the shape replicating a standard silhouette of to be observed subject or object.

The surface of said references can be chosen to be homogeneous, for a example a reference with a homogenous colour, or could be formed of regular or irregular stripes, or regular or irregular, e.g. randomly, distributed points or patterns, as far as a well-defined overall shape of the reference can be derived from the irregular or randomly distributed points of patterns.

The references may be self-luminous, for example comprising phosphorescent materials or light sources, or the references may comprise reflective materials.

In practice and from a computational point of view, rectangular shapes of the reference(s), for example rectangular stripes can inter alia be preferred, as they may be processed easier and faster during the analysis of a time series based on the occultation of references having rectangular shapes.

As mentioned before, a plurality of references can be used as basis for measuring the occultation of said reference(s) due to at least one subject and/or at least one object.

Such a possible plurality of references may comprise a plurality of equal references or a plurality of different references. Said plurality of references may be arranged such, as to maximize the likelihood, that a subject or object passing one reference passes also at least one further reference of the plurality of references.

That is for example, said plurality of references may be arranged sequentially and substantially parallel to the main direction of the movement of subjects and/or objects when passing a/the monitored gate. As pointed out before, other orientations of the references are possible too, such as for example orientations which are not parallel to the main direction of the movement of subjects and/or objects when passing a/the monitored gate.

Furthermore, it is for example is conceivable, that a pair of references is used, wherein the references differ from each other in at least one characteristic, such as colour and/or contrast and/or shape.

For example a pair of references may be used, wherein the references differ from each other in terms of colour.

The use of a plurality of references having different characteristics can help to minimize the so-called camouflage effect, wherein the subject or object to be monitored has/have sufficiently similar characteristics as the reference occulted by said subject or object, such that the occultation of the reference by said subject or object cannot be detected or measured properly with sufficient accuracy.

Therefore when a plurality of references with different characteristics are used, chances are increased that at least for one reference an occultation due to a passing subject or object can be properly detected and measured.

When for example a plurality of references having different characteristics, for example a pair of different references is used, the resolution of the system for detecting tailgating of subjects and/or objects can depend on the distance of the references with respect to each other, wherein the closer the references with different characteristics are placed with respect to each other, the better the resolution of the system.

As mentioned before, the measuring of the occultation of at least one reference occulted by at least one subject and/or at least one object passing through at least one gate can, for example, be carried out by at least one camera configured for capturing single image frames and/or a stream of image frames, e.g. a video stream.

For example said camera can be configured to record a stream of image frames, i.e. a video stream, wherein consecutive frames are separated by an increment of time and which for example depends on the number of frames per second (FPS) that can be recorded.

With 25 FPS, for instance, each frame is 0.04 seconds away from the previous or the posterior frame.

Preferable a camera can be used, wherein the number of frames per second exceeds 25 FPS, to achieve a better time resolution of the measured occultation.

However, it also conceivable that a camera can be used wherein the number of frames per second is less than 25 FPS, for example around 10 FPS, to achieve acceptable results.

The camera can further be configured such that each recorded image frame is marked with a time-stamp, so that the image stream can inter alia be understood as a time series with a discrete time axis.

Exemplary the at least one camera can be a single-channel camera, e.g. a camera for recording image streams in black-and-white, or can be a multichannel camera, for example a three-channel camera, e.g. for red-green-blue colours for providing a colour image stream/colour video.

Optionally, the image data, e.g. the image frames, recorded by the camera, can be pre-treated/modified, for example their contrast or sharpness or colours may be enhanced in order to facilitate a subsequent analysis for determining at least one parameter from a generated time series for characterization of the at least one subject and/or at least one object passing through at least one gate. Another pre-treatment can consist in the computation of motion flows between two frames, e.g. interpolation of the motion vectors of moving subjects/objects, either of immediately consecutive frames or of separated frames by ignoring some intermediate frames. Another pre-treatment can consist in the regionalization of the scene into regions or zones of similar properties, for example zones of similar colour and/or contrast and/or brightness.

The determining of the at least one parameter determined from the at least one generated time series for characterization of the at least one subject and/or at least one object passing through at least one gate, and wherein said at least one generated time series is based on a measured occultation, can comprise determining at least one of the following one-dimensional or multi-dimensional parameters:

a count for the number of subjects and/or object passing the gate, a profile of a passing subject and/or object, a passing speed of a passing subject and/or object, a spatial extent in one or more spatial dimensions of a passing subject and/or object, a spatial volume and/or spatial proportions of a passing subject and/or object, a time interval, e.g. the time interval of the lapse of time between two consecutive subjects and/or objects passing the at least one gate.

Therein a profile of a passing subject and/or object can be understood for example as the silhouette of a passing subject and/or object.

A spatial extent in one or more spatial dimensions of a passing subject and/or object can be understood for example as a height, a width or a thickness of a subject and/or object.

To detect and/or alert a fraudulent pass or fraudulent pass attempt, a parameter determined from the generated time series can be compared for example to average standard values or value ranges for a specific parameter based on heuristic experiments, machine learning procedures or theoretical models.

In particular a method or system according to the invention can comprise determining whether the at least one parameter determined from the at least one generated time series for characterization of the at least one subject and/or at least one object passing through at least one gate is within a value range and/or above or below a predetermined threshold value that qualifies the pass of the gate by the at least one subject and/or at least one object as a valid legal pass or as a fraudulent illegal pass.

For example, this comparison of parameter values or ranges for the at least one parameter determined from the at least one generated time series for characterization of the at least one subject and/or at least one object passing through at least one gate to standard or predefined value or ranges, can comprise evaluating whether a determined time interval of the lapse of time between two consecutive subjects and/or objects passing the at least one gate lies below a predetermined time interval for the at least one gate, and/or evaluating whether a determined passing speed of a passing subject and/or object, and/or whether a determined spatial extent in one or more spatial dimensions of a passing subject and/or object, and/or whether a determined spatial volume of a passing subject and/or object, lies within a predefined value range.

As indicated before a predefined value range and/or the predefined threshold value for the at least one parameter from the at least one generated time series for characterization of the at least one subject and/or at least one object passing through at least one gate, can for example be derived from an automatic machine learning procedure or can be derived from human heuristic observations.

The generation of a time series based on the measured occultation can comprise generating a curve for the relation of amount of occultation of the at least one reference in dependence of time.

Therein the amount of occultation of the at least one reference due to a subject and/or object occulting said reference when passing a gate can inter alia be understood as degree or level of occultation, and may for example be normalized using the convention that 0 (zero) marks the case where the reference is not occulted by a subject and/or object and that 1 (one) marks the case where the reference is completely/entirely occulted by a subject and/or object.

For example, if for image frames recorded by a camera, the amount of occultation of the at least one reference due to a subject and/or object occulting said reference is measured, these measurements can be assigned the timestamps of the image frames, thereby generating a time series graph/curve.

It is further possible that the step of determining at least one parameter from the at least one generated time series for characterization of the at least one subject and/or at least one object passing through at least one gate can be based on carrying out the steps of measuring the occultation of at least one reference occulted by at least one subject and/or at least one object passing through at least one gate, and generating a time series based on the measured occultation as part of the training of a machine learning system.

In other words it is possible that a system can be trained for detecting tailgating of subjects and/or objects at gates using image frame stream, e.g. video, data, wherein the training comprises measuring and analyzing occultations of background objects in image/video data by subjects and/or objects occulting said background objects, and/or wherein the training can also include learning standard values or value ranges for parameters determined from time series based on occultation measurements that can be used to define the values that are considered to be indicative of legal valid passing of the gate by a subject/object.

Such a machine learning system and machine learning approach can furthermore also comprise training a machine learning system based also on data that extends beyond the data solely used for measuring and analyzing occultations of background objects in image/video data by subjects and/or objects occulting said background objects. In other words, also data from image frames subparts that are not containing references occulted by passing subjects/objects and/or that are not only containing references occulted by passing subjects/objects, for example even the full image frame, can be used as input to the machine learning system to be able to learn to take a precise and consistent decision when evaluating a gate passing of a subject/object.

Furthermore it is conceivable that computer readable instructions could be stored on one or more computer readable storage, which when executed by one or more processors direct the one or more processors to perform a method for detecting tailgating of subjects and/or objects at gates or gate systems, which can comprise steps as described above, in particular can comprise one or some or all of the following steps:
- measuring the occultation of at least one reference occulted by at least one subject and/or at least one object passing through at least one gate
- generating a time series based on the measured occultation
- determining at least one parameter from the at least one generated time series for characterization of the at least one subject and/or at least one object passing through at least one gate.

An exemplary system according to the invention for detecting tailgating of subjects and/or objects at gates can comprise: at least one camera, at least one reference, at least one digital data analysis unit, wherein the at least one camera can be configured for measuring the occultation of at least one reference occulted by at least one subject and/or at least one object passing through at least one gate, and wherein the digital data analysis unit can be configured for generating a time series based on the measured occultation, and wherein the digital data analysis unit can be further configured for determining at least one parameter from the at least one generated time series for characterization of the at least one subject and/or at least one object passing through at least one gate.

Said digital data analysis unit can, for example, also be configured to handle the data analysis of a plurality of cameras and may be configured for a parallel processing of data received from a plurality of cameras, i.e. can be configured for a parallel generation of time series based on measured occultations and for a parallel determination at least one parameter from the at least one generated time series for characterization of the at least one subject and/or at least one object passing through at least one gate.

A system according to the present invention may comprise only a single camera for measuring the occultation of at least one reference occulted by at least one subject and/or at least one object passing through at least one gate or gate system.

For example, the at least one camera can be arranged such, that its line of sight is not parallel to the main direction of the movement of subjects and/or objects when passing a/the gate, and wherein preferably its line of sight is also not parallel to the direction of gravity.

Furthermore the camera may be located below the ceiling not in a straight zenithal position but can be arranged with an oblique direction of its line of sight with respect to a main direction of the movement of subjects and/or objects passing a control gate.

An exemplary system may further comprise a data transmission unit for transmitting data from the digital data analysis unit to a central data analysis unit and/or to a mobile data analysis unit, e.g. a mobile phone.

This way alerts can for example be automatically sent, even in real-time, to mobile phones of security people, e.g. ticket inspectors, allowing them for example to be mobile within the transport network and allowing them to control any entrance hall, respectively control gate, independently of their location, by for example selecting the desired entrance point or gate to control via an application on their phone.

The at least one camera can further capture a movement or position of a monitored subject and/or object passing the gate with a precision high enough, as to allow for the extraction of a subframe of a captured image frame, for example a subframe only containing a subject or object suspected of a fraudulent gate access, and which can be scaled up and saved and sent as proof, instead of using the full size of a captured image frame.

The following figures illustrate exemplary:
FIG. 1: Exemplary gate system
FIG. 2a: Exemplary configuration of a subject passing in front of a reference
FIG. 2b: Exemplary schematic image frames
FIG. 3: Exemplary occultation curve
FIG. 4: Further exemplary occultation curves FIG. 1 shows an example of a gate system 100 exemplary configured for detecting tailgating of subjects and/or objects passing a gate 101, 102 of the gate system.

The gate system 100 for example separates a public/free area 133 from a restricted area 134, e.g. an area that requires an authorization/ticket, such as for example a public transport area, e.g. metro station, and can provide a controlled access from the public/free area 133 into the restricted area 134 and vice versa.

The gate system 100 can comprise at least one gate. Here, the gate system 100 exemplary comprises two gates 101 and 102. Furthermore the gate system 100 can comprise fixed separators 110, 111, 112, 113, 114 which can delimit the public/free area 133 from a restricted area 134.

Said fixed separators can be wall-like and can be for example anchored to the ground, such as for example fixed separators 110, 111, or can be mounted onto gate enclosures 115, 116, 117, such as for example fixed separators 112, 113, 114.

The exemplary gates 101, 102 can be provided with movable doors, for example movable, e.g. sliding, gate doors 105, 106, 107, 108.

A possible movement of said sliding gate doors 105, 106, 107, 108 is exemplary illustrated by the reference numeral 109.

In their open state (as shown) the sliding gate doors 105, 106, 107, 108 can allow the passage of subjects and/or objects through the gates 101, 102.

The arrows 129, 130 exemplary show a possible direction of movement of subjects and/or objects (not shown) passing a gate 101, 102.

The shown gate system 100 further comprises a plurality of exemplary references 119, 120, 121, 122, 123, 124, 125, 126, 127, 128 which potentially can get occulted by a subject and/or object while passing a gate 101, 102.

Said references could be of any of the type or shape of references described above, as long as at least some of said references 119, 120, 121, 122, 123, 124, 125, 126, 127, 128 can potentially at least partly be occulted by at least some of to be monitored subjects or objects while passing a gate 101, 102 of the gate system 100.

Exemplary, the shown references 119, 120, 121, 122, 123, 124, 125, 126, 127, 128 can comprise rectangular stripes that can for example be attached to/or be part of a lateral wall or side 131, 132 of a gate enclosure 116, 117.

The displayed horizontal orientation of said rectangular stripes, wherein the long side of the stripes is arranged substantially parallel to the main direction 129, 130 of the movement of subjects and/or objects is just an example.

Other orientations, for example vertical or oblique orientations of references 119, 120, 121, 122, 123, 124, 125, 126, 127, 128 are possible too.

It is further conceivable that for example at least some of said references could be attached to the floor 118 of the gate system control zone 135 or that said references could be attached to moving parts of the gate system 100, e.g. to edges of gate doors 105, 106, 107, 108, or fixed parts of the gate system 100, e.g. to edges of the separator walls 112, 113, 114.

As exemplarily shown, the edges 136, 137 of fixed separator walls 112, 113 can serve as references themselves, or references could be attached to said edges 136, 137, thereby, for example, defining strip-like references which can, for example, be substantially parallel to the direction of gravity.

Said exemplary references 119, 120, 121, 122, 123, 124, 125, 126, 127, 128, 136, 137 further can lie in the field of view 104 of a camera 103, for example, such that at least some or parts of said references can be occulted by a subject or object passing a gate 101, 102.

Said camera 103 can monitor the gate system 100, and in particular can for example monitor the control zone 135 of the gate system 100.

Furthermore, said exemplary camera 103 can, for example, be arranged such, that its line of sight is not parallel to the main direction 129, 130 of the movement of subjects and/or objects when passing a gate, and wherein preferably its line of sight is also not parallel to the direction of gravity.

Moreover, said camera 103 can be configured for measuring the occultation of at least one reference 119, 120, 121, 122, 123, 124, 125, 126, 127, 128 occulted by at least one subject and/or at least one object passing through at least one gate 101, 102 of the gate system 100.

Measured occultation data can then for example be forwarded to an exemplary digital data analysis unit (not shown), which can for example be configured for generating a time series based on the measured occultation.

Said exemplary digital data analysis unit can further be configured for determining at least one parameter from the at least one generated time series for characterization of the at least one subject and/or at least one object passing through at least one gate 101, 102 of the gate system 100.

Figure 2A:
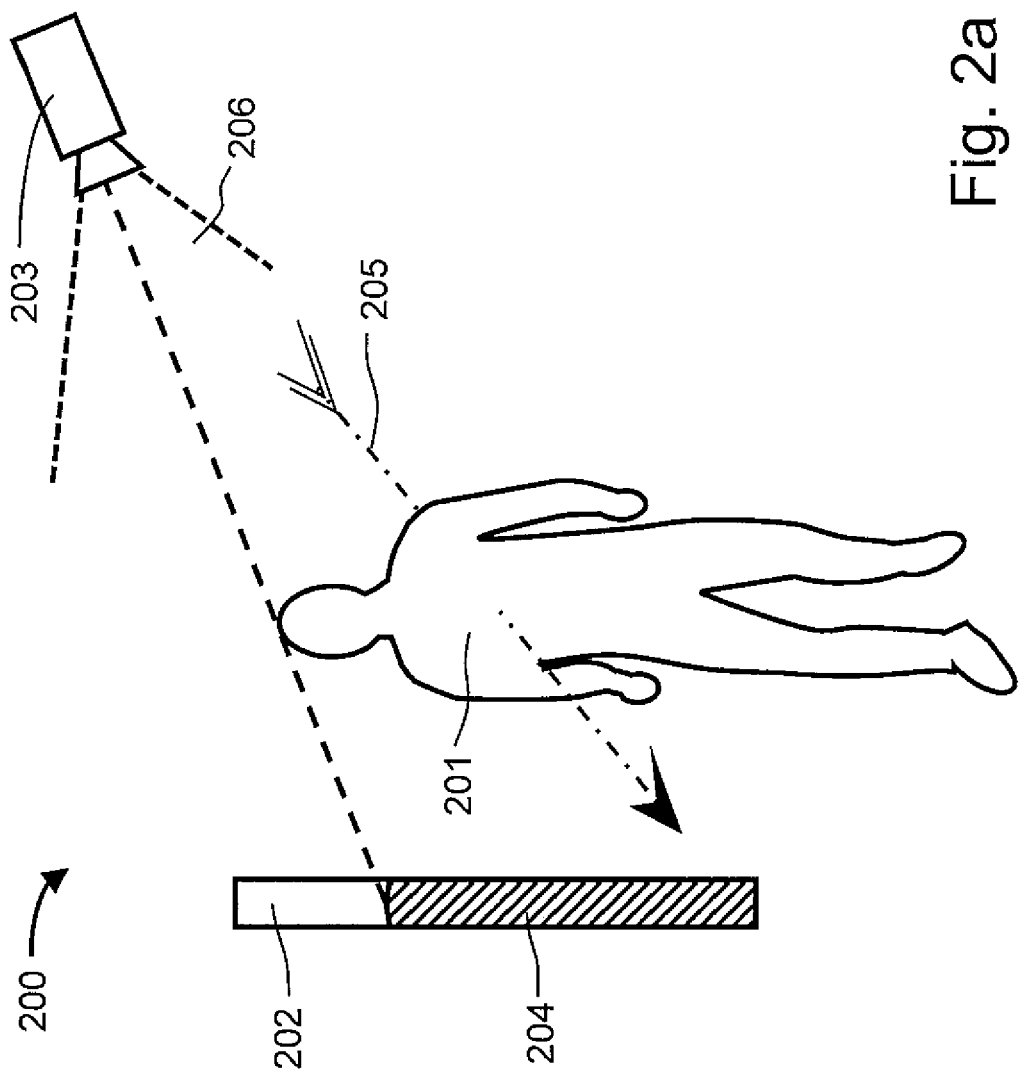

FIG. 2*a* shows a schematic example of a scenario 200 or event configuration, wherein a subject 201 moving along a direction 205 passes in front of a reference 202 of a gate (not shown) or gate system (not shown).

For example, said reference could be an edge part of a gate, for example an edge of a fixed separator. For example, said reference could be an edge of a fixed separator, that is substantially parallel to the direction of gravity, thereby defining a vertical strip-like reference.

A camera 203, for example, can be arranged such, that its line of sight is not parallel to the direction 205 of the movement of the subject 201 passing in front of the reference and that its field of view 206 covers at least parts of the reference 202 and at least parts of the subject 201.

The camera 203 can be configured for measuring the occultation of the exemplary reference 202 occulted by the subject 201, which for example is in the process of passing through a gate of a gate system (not shown).

From the perspective of the exemplary camera 203 and for the exemplary displayed instant of time, i.e. point in time, the subject 201 occults a part 204 of the reference 202

Figure 2B:
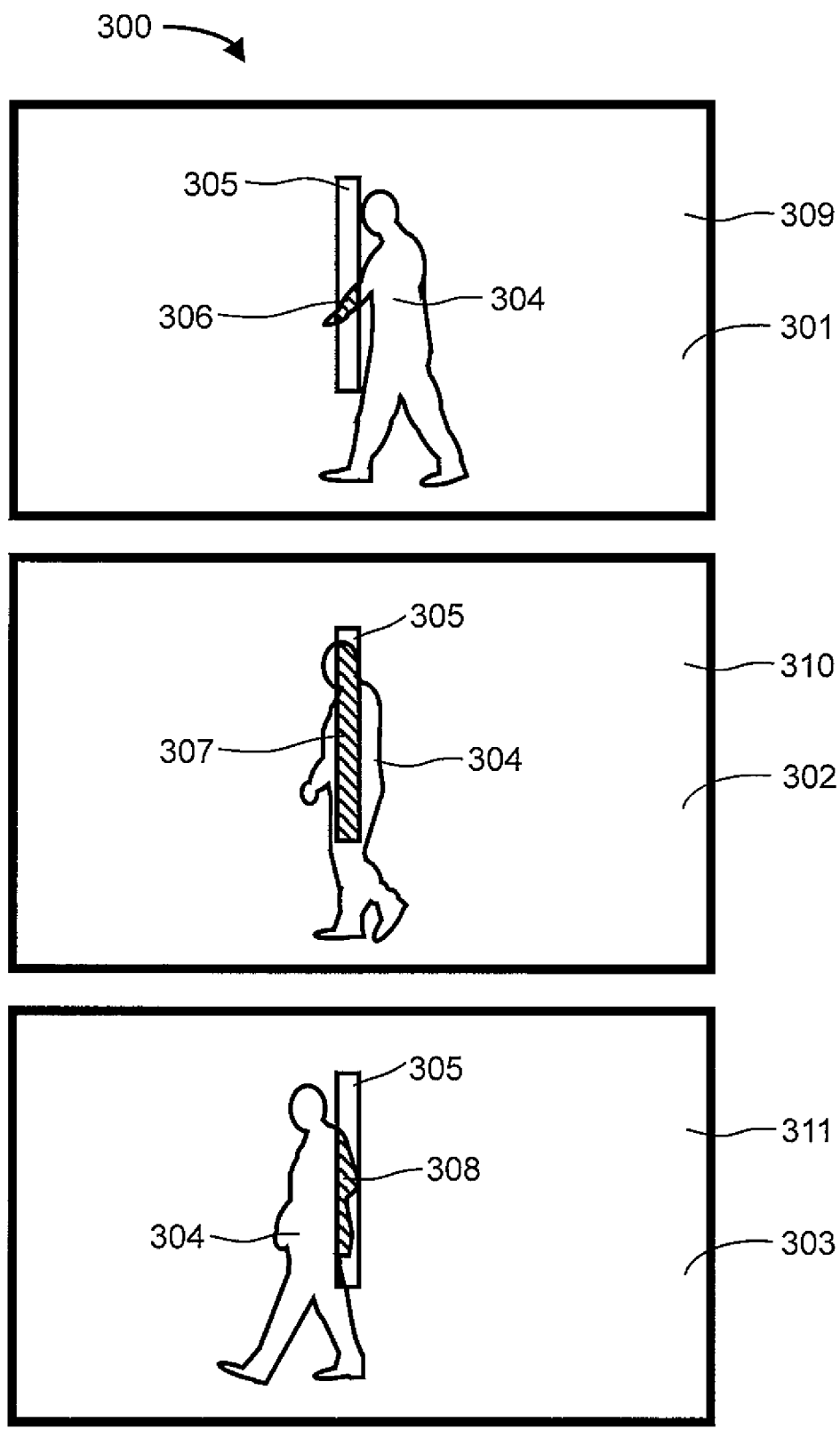

FIG. 2*b* shows exemplary a time series 300 comprising three exemplary image frames 301, 302, 303 for example taken by an exemplary camera (not shown), for example a camera identical or analog to camera 203, wherein the three image frames 301, 302, 303 are taken at three different points in time 309, 310, 311, for example at consecutive points in time, and wherein said exemplary image frames capture three different positions 309, 310, 311 of a subject 304, for example a subject analog or identical to subject 201, passing in front of a reference 305.

Said exemplary image frames 301, 302, 303 can be for example be part of a video stream captured by said exemplary camera.

Said reference 305 can be part of a gate or gate system, for example can be part of a gate system analog or identical to gate system 100.

As is exemplary illustrated, the subject 304 occults different fractions 306, 307, 308 of the reference 305 in each of said exemplary image frames 301, 302, 303, i.e. occults different fractions 306, 307, 308 of reference 305 at different points in time 309, 310, 311, for example representing three different positions 309, 310, 311 of the subject 304, while passing in front of the reference 305 of a gate (not shown).

Figure 3:
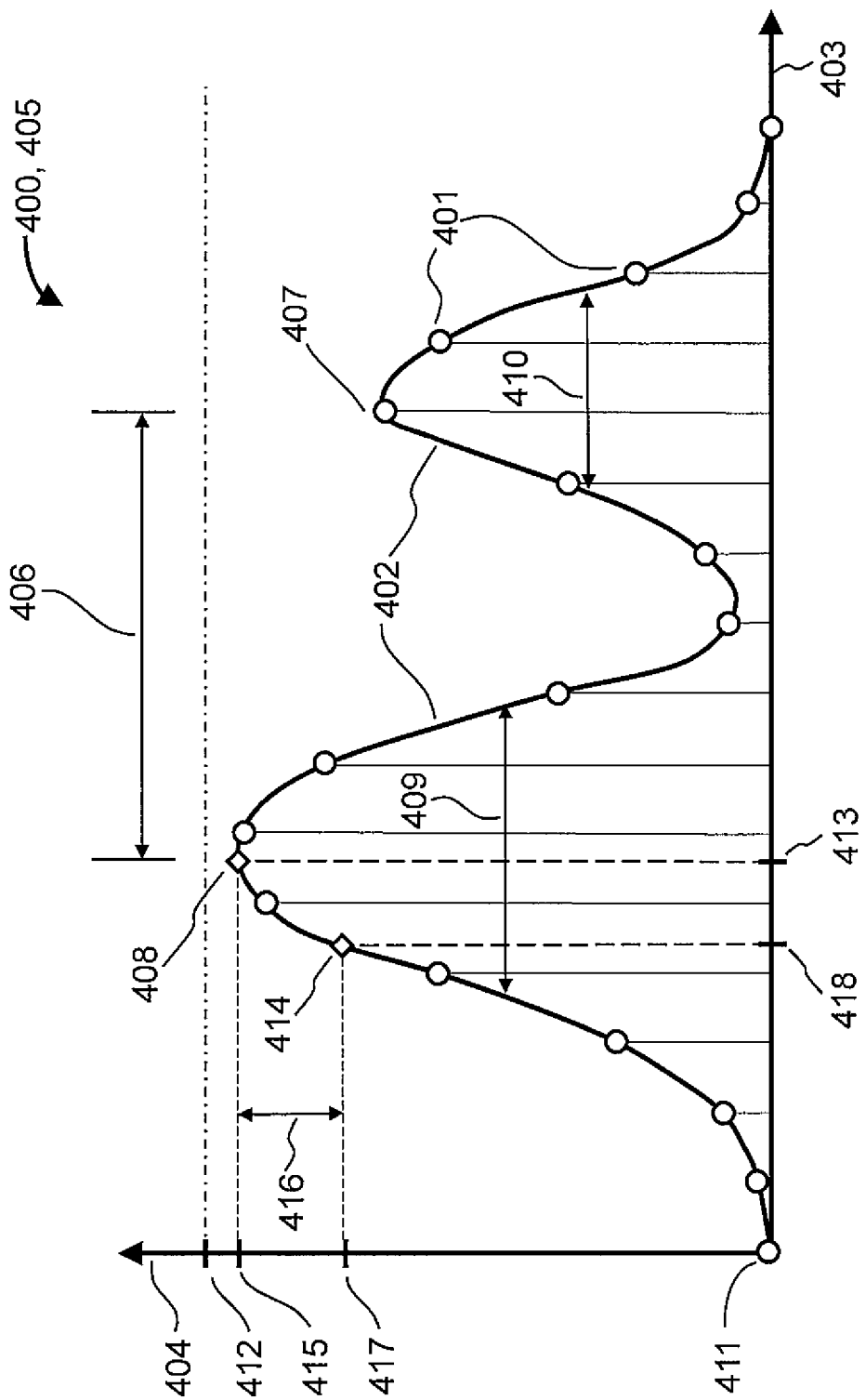

FIG. 3 shows exemplary a time series 400 or graph 405 of a plurality of occultation measurements 401 derived/generated from image frames of an exemplary camera (not shown) configured for measuring the occultation of at least one reference occulted by at least one subject and/or at least one object passing through at least one gate of a gate system (not shown).

The abscissa 404 or Y-axis of graph 405, for example, can represent a measure for quantifying the degree or level or amount of occultation of a reference or a plurality of references by a subject or object, i.e. for example the fraction of a reference or a plurality of references occulted by a subject and/or object, for example the surface area fraction of a reference or a plurality of references occulted by a subject and/or object.

This also can inter alia comprise the degree or level or amount of occultation by a subject or object with respect to only selected parts of a reference or a plurality of reference, e.g. occultations of the center or the border regions of a reference.

Said abscissa 404 or Y-axis of graph 405 may for example be normalized using a convention such that the origin 411, for example 0 (zero), marks the case where a reference or a plurality of references is not occulted by a subject and/or object and that 1 (one) marks the case 412 where the reference or a plurality of references is completely/entirely occulted by a subject and/or object.

The ordinate or X-axis 403 of graph 405, for example, can represent a time axis or an image frame number or image frame time stamp. The X-axis 403 can be continuous or discrete.

For example said X-axis 403 may represent image frame numbers from a video stream, wherein consecutive frames are separated by an increment of time and which for example depends on the number of frames per second (FPS) recorded in the video stream.

With 25 FPS, for instance, each frame is 0.04 seconds away from the previous or the posterior frame.

The number of frames per second, for example, can exceed 25 FPS, to achieve a better time resolution of the measured occultation.

This exemplary time series 400 based on the measured occultations of at least one reference occulted by at least one subject and/or at least one object passing through a gate of a gate system (not shown) can serve as a basis for determining at least one parameter for a characterization of said at least one subject and/or at least one object passing through said gate.

The measurements of the exemplary discrete time series 400 or graph 405 can also, for example for computational purposes, be connected to form a continuous curve 402, wherein said connections between measurements 401 can be simple straight lines or the curve 402 may be smoothed by modeling the connection of measurements 401 with lines having a higher polynomial degree, or with lines generated from running average methods, or with lines generated with the help of signal filtering techniques, or by fitting the measurements 401 by a model for modeling the occultation of a reference by a subject and/or object.

The possible use of the curve 402, instead of the discrete graph 405, as basis for the analysis can, for example together with a use of continuous X-axis, inter alia improve the accuracy with which parameters for the characterization of subjects and/or objects can be determined and can reduce the errors associated with pixel variation.

The time series 400 or graph 405 or curve 402 represents the degree or level or amount of occultation of a reference or a plurality of references by a subject or object in dependence of time, respectively in dependence of a position of subject or object passing in front of said reference(s).

It is to be noted, that in general a given event of a subject or object passing the gate can give rise to a plurality of time series or graphs or curves. For example, it is conceivable, that a plurality of time series or graphs or curves is generated by selecting occultation measurements of different parts of a reference. For example, a time series or graph or curve may be based only on occultation measurements of a central region or a border region, for example, a top region or a bottom region or a side region, of a reference. This can allow to optimize the analysis of generated time series to derive parameters for the characterization of the at least one subject and/or at least one object passing through at least one gate.

As described above, for example, at least one of the following one-dimensional or multi-dimensional parameters can be determined from time series such as, for example, time series 400:

a count for the number of subjects and/or object passing the gate, a profile of a passing subject and/or object, a passing speed of a passing subject and/or object, a spatial extent in one or more spatial dimensions of a passing subject and/or object, a spatial volume and/or spatial proportions of a passing subject and/or object, a time interval, e.g. the time interval of the lapse of time between two consecutive subjects and/or objects passing a/the gate.

Said exemplary parameters for the characterization of the at least one subject and/or at least one object passing through at least one gate can be derived from the analysis of time series 400 or graph 405 or curve 402, i.e. for example from an analysis of characteristics of the curve 402, such as height and/or width and/or number of peaks, and/or shape of peaks 407, 408, and/or slopes, and/or general shape of curve 402, and/or area below curve and the like, and/or from the behavior of derivates of the curve 402.

For example the distance 406 between two consecutive peaks/two consecutive maxima 407, 408 of graph 405 or curve 402 can be an estimate of the time interval of the lapse of time between two consecutive subjects and/or objects passing a/the gate of a gate system (not shown).

The width of a peak, for example the full width at half maximum of a peak 409, 410 can be an estimate for a spatial extent in one or more spatial dimensions of a passing subject and/or object, as well as, for example, an estimate for a passing speed of a passing subject and/or object.

It is further possible, for example, to normalize the X-axis 403 of graph 405 or curve 402, for example by a standard speed for a subject or object passing a gate, so that for example by comparing, e.g. cross correlating, a measured curve 402 with a standard speed curve (not shown), an estimate of the speed of the subject/object passing the gate can be derived, since, for example, a measured curve which is stretched in a horizontal direction as compared to a curve with standard speed, may indicate a faster than average speed of a subject/object, whereas a measured curve which is compressed in a horizontal direction as compared to a curve with standard speed, may indicate a slower than average speed of a subject/object.

The number of peaks of graph 405 or curve 402 can, for example, be an estimate for the number of subjects and/or objects passing a gate.

However, other parts of graph 405 or curve 402 can also be used as an estimate for the number of subjects and/or objects passing a gate. For example, a point on a rising part of a peak can be used as an estimate for the number of subjects and/or objects passing a gate. For example, a point reaching a certain predefined value, for example normalized by the peak value or peak height, e.g. a point at 85% of the peak value or peak height may give a more accurate estimation of the separation between subjects/objects and their number.

For exemplary purpose FIG. 3 shows such point 414 on the rising part of peak 408, which may be used as additional or alternative indicator of the point in time 418 when a (first) subject/object is passing a gate.

Reference numeral 416 here exemplary marks the fraction of height h of peak 408, for example defined as h/c, wherein c is a constant.

With this convention reference numeral 417 exemplary marks the occultation value of occultation point 414 on rising part of peak 408 at (h-h/c) height.

An analogous point (not shown) on the rising part of peak 407 may be defined, in order to provide an additional or alternative indicator of the point in time when a further (second) subject/object is passing the gate.

For example, the distance or separation (not shown) between two points on the rising parts of two different peaks of a curve such as 402, may further serve as an additional or alternative indicator for the separation between two subject or objects passing the gate.

To detect and/or alert a fraudulent pass or fraudulent pass attempt, such one-dimensional or multi-dimensional parameter or parameters estimated or determined from the generated time series 400, graph 405 or curve 402, can be compared, for example, to pre-defined criteria, such as average standard values or value ranges for the specific parameter(s) or standard shapes of graphs or curves based on heuristic experiments, machine learning procedures or theoretical models.

In particular a method or system according to the invention can comprise determining whether the at least one parameter determined from the generated time series 400, graph 405 or curve 402, for characterization of the at least one subject and/or at least one object passing through at least one gate is within a value range and/or above or below a predetermined threshold value that qualifies the pass of the gate by the at least one subject and/or at least one object as a valid legal pass or as a fraudulent illegal pass.

For example, this comparison of parameter values or ranges for the at least one parameter determined from the generated time series 400, graph 405 or curve 402, for characterization of the at least one subject and/or at least one object passing through at least one gate to standard or predefined value or ranges, can comprise evaluating whether a determined time interval 406 of the lapse of time between two consecutive subjects and/or objects passing the at least one gate lies below a predetermined time interval for the at least one gate, and/or evaluating whether a determined passing speed of a passing subject and/or object, and/or whether a determined spatial extent in one or more spatial dimensions of a passing subject and/or object, and/or whether a determined spatial volume of a passing subject and/or object, lies within a predefined value range.

For example, if the time interval 406 between two consecutive peaks of the time series 400, graph 405 or curve 402 lies below the minimum time required between two legally/validly passing subjects or objects or below a standard time to have a gate closing, a fraudulent pass attempt could be identified.

Furthermore, the shape or behaviour of the time series 400, graph 405 or curve 402 alone, can be indicative of whether a pass of a gate is a valid pass or whether a fraudulent pass attempt has occurred.

As indicated before a predefined value range and/or the predefined threshold value for the at least one parameter from the generated time series 400, graph 405 or curve 402, for characterization of the at least one subject and/or at least one object passing through at least one gate, can for example be derived from an automatic machine learning procedure or can be derived from human heuristic observations.

In view of the above, the displayed example of time series 400, graph 405 or curve 402, for characterization of the at least one subject and/or at least one object passing through at least one gate may, depending on applied pre-defined criteria, represent a valid/legal pass of two subjects passing a gate.

It is further conceivable that some or all of said one-dimensional or multi-dimensional parameters for characterizing subject or object passing a gate are for example used as parameters of a theoretical model, and the estimates of said parameters are obtained as best fit parameters of the model fitted to a measured occultation time series or a derived occultation curve, such as for example curve 402.

For example, a determined best fit model of the curve 402 can be compared to a database of occultation curves in order to distinguish a fraudulent gate pass or fraudulent gate pass attempt from a non-fraudulent/legal/valid gate pass of a subject or object.

A system can for example be trained for detecting tailgating of subjects and/or objects at gates using an image frame stream, e.g. video, data, wherein the training comprises measuring and analyzing occultations of background objects in image/video data by subjects and/or objects occulting said background objects, and/or wherein the training can also include learning standard values or value ranges for parameters determined from time series, graphs or curves based on occultation measurements, e.g. a time series analogues to 400, or learning standard shapes of time series, graphs or curves, that can be used to define the values that are considered to be indicative of legal valid passing of the gate by a subject/object.

Figure 4:
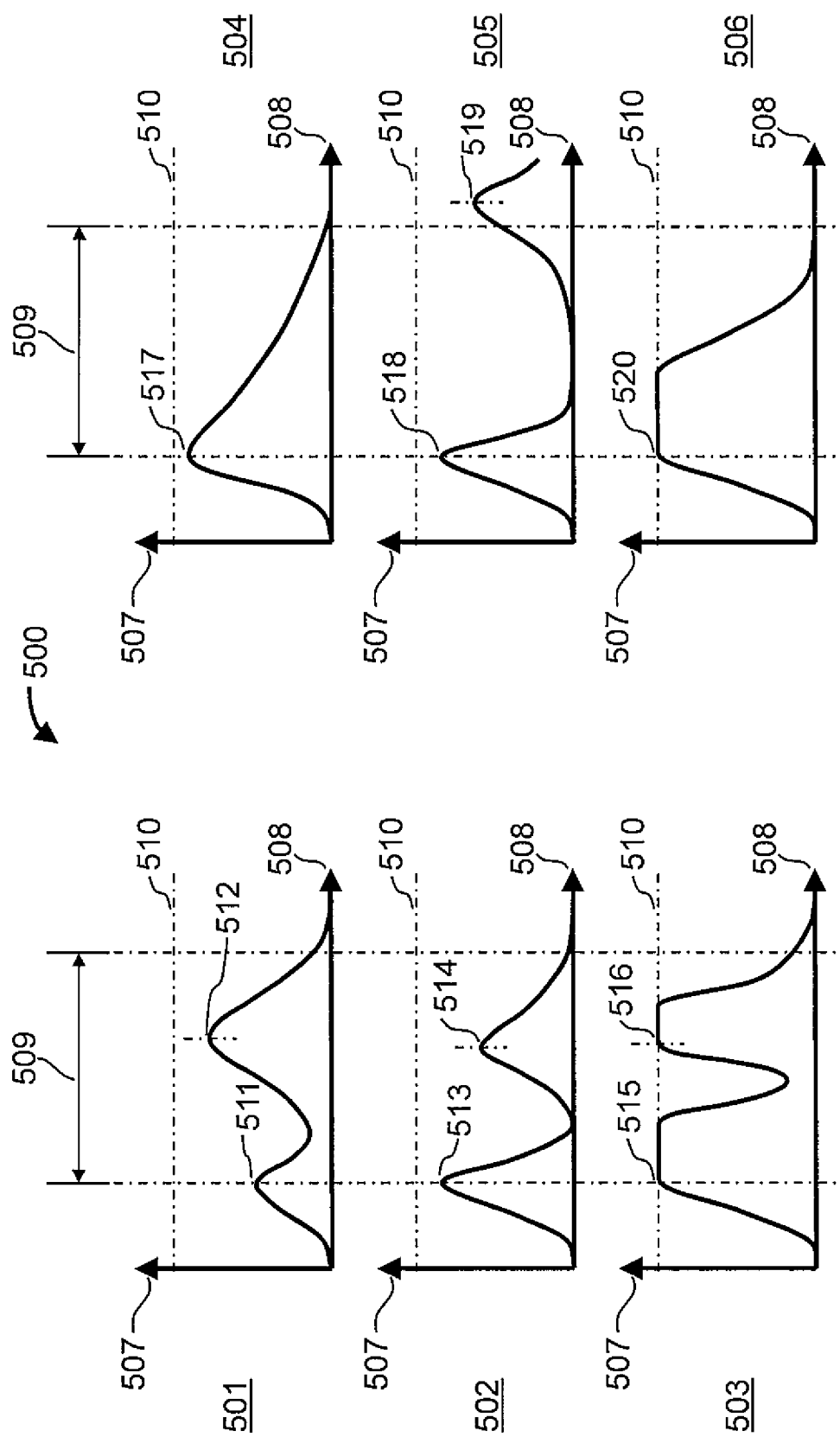

FIG. 4 shows further examples for time series or graphs or curves 501, 502, 503, 504, 505 and 506 derived from of a plurality of occultation measurements generated from image frames of an exemplary camera (not shown) configured for measuring the occultation of at least one reference occulted by at least one subject and/or at least one object passing through at least one gate of a gate system (not shown).

For simplicity it can be, for example, assumed that the respective scales of the shown X-axes 508 are the same and that also the respective scales of the shown Y-axes 507 are the same.

Analogously to FIG. 3 the Y-axes 507, for example, can represent a measure for quantifying the degree or level or amount of occultation of a reference or a plurality of references by a subject or object, i.e. for example the fraction of a reference or a plurality of references occulted by a subject and/or object, for example the surface area fraction of a reference or a plurality of references occulted by a subject and/or object.

Also in analogy to FIG. 3, the Y-axes 507, for example, can be normalized using a convention such that the origin, for example 0 (zero), marks the case where a reference or a plurality of references is not occulted by a subject and/or object and that 1 (one) marks the case 510 where the reference or a plurality of references is completely/entirely occulted by a subject and/or object.

The X-axes 508, for example, can again represent a time axis or an image frame number or image frame time stamp. The X-axes 508 can be continuous or discrete.

For example, assuming an exemplary predefined (minimum) legal time interval 509 between passes of two consecutive subjects/objects, an attempt can be made to determine whether two consecutive passes of two subjects/objects can be classified as legal passes or non-legal passes.

As mentioned before, as an estimator for the time-lapse between two consecutive passes, for example, the distance or separation of two consecutive peaks of an occultation curve and/or the distance of points on the rising part of a peak at a predefined (intermediate) height of two consecutive peaks of an occultation curve may be used.

For example, based on the exemplary shown predefined (minimum) legal time interval 509 between passes of two consecutive subjects/objects, the occultation curves 501, 502 and 503 could be classified as representing non-legal passes, since both peaks 511, 512, 513, 514, 515, 516 of each of the curves 501, 502 and 503 substantially lie within or below the predefined (minimum) legal time interval 509, thereby indicating that a second subject/object has passed too close after a first subject/object.

Occultation curve 504 on the other hand can, for example, be classified as representing a legal gate pass of the subject, as within the exemplary legal (minimum) time interval 509 only one peak 517 of the occultation curve is measured.

Occultation curve 505 can also, for example, be classified as representing a legal gate pass of the subject, as the second peak 519 substantially lies outside/above the (minimum) legal time interval 509.

Occultation curve 506 can represent an example of an ambiguous case, wherein the flattening or saturation of the peak 520 may indicate the passing of two subjects/objects with no or almost no separation between each other. In such a case further analysis of the occultation curve may be conducted in order to resolve the ambiguity between classifying curve 506 as a legal or non-legal gate pass.

Such a further analysis may, for example, involve one, some, or all of the following steps:
  a determination of whether the area below the curve 506 is significantly far outside the statistical mean, for example by more than two standard deviations, for subjects/objects of a similar height or similar peak values, wherein said determination can be carried out on a raw (unprocessed) version of the occultation curve 506, or can be carried on a transformation of the occultation curve, such as, for example, a rescaled version, for example, a compressed or stretched version of the occultation curve 506, for comparison with a range of standard speeds of subject/objects.
  a re-analysis or re-reduction of the data, e.g. image frames, from which the curve 506 was derived from, in particular, for example a re-analysis of the image frames close to and at the peak of the of the curve 506, wherein said re-analysis, may for example comprise, determining whether the foreground (for example, a region in the analyzed frame having a colour that is significantly different from a background colour, wherein said background is for example computed as a moving average of image frames of an image stream) has an area significantly different from the statistical mean for an object/subject of a similar height.
  a re-analysis or re-reduction of the data, e.g. image frames, from which the curve 506 was derived from, in particular, for example a re-analysis of the image frames close to and at the peak of the of the curve 506, wherein said re-analysis, may for example comprise, determining whether the foreground's silhouette is significantly less convex than the convexity of a regular legal pass, whereby for example the convexity can be measured as the ratio between silhouette area and silhouette perimeter, and wherein for example a silhouette with a high convexity comprises a larger area under a smaller perimeter as compared to a silhouette with a standard convexity.
  a re-analysis or re-reduction of the data, e.g. image frames, from which the curve 506 was derived from, in particular, for example a re-analysis of the image frames close to and at the peak of the of the curve 506, wherein said re-analysis, may for example comprise, determining whether the foreground's silhouette shape/contour of the passing subject/object matches, within a acceptable tolerance, a known/stored reference silhouette shape/contour of a legal pass of a subject/object.

Furthermore, it is in general conceivable that a method or system for detecting tailgating of subjects and/or objects at gates comprises an analysis of the time series or occultation curves based on the measured occultation of at least one reference occulted by at least one subject and/or at least one object passing through at least one gate, wherein selected parts or selected features of the time series or occultation curves can be excluded from the analysis.

For example, partial and relatively small occultations of a reference, for example by extremities of a subject (see for example in FIG. 2b the occultation of a rather small part of the reference 305 at time point 309 by the lower arm of subject 304) or an accessory (for example a bag, a box, an umbrella, a hat or the like) carried by a subject can be considered less or not relevant or even misleading when analysing the time series or occultation curves.

Apart from, for example, manually removing or excluding such partial, isolated and relatively small occultations or occultation curve features from the analysis, the selection or filtering out of such less or not relevant occultation curve features can be done automatically, for example by a digital data analysis unit and can, for example, be based on defining thresholds and/or intervals for a to be excluded size and/or to be excluded extent and/or to be excluded position of occultation curve features as compared to the overall occultation curve and/or on the basis of a threshold and/or interval with respect to how far (in physical distance) an occultation point or a set of occultation points is located away or detached from an end of a reference (for example from a bottom a reference).

Excluding selected and deemed less relevant parts or features of the time series or of the occultation curves from the analysis can inter alia facilitate and/or reduce the number of false positives and/or speed up the analysis and for the characterization of the at least one subject and/or at least one object passing through at least one gate.

The project leading to this application has received funding from the European Union's Horizon 2020 research and innovation program under grant agreement No. 767807.

Followed by five sheets comprising FIG. 1, FIG. 2a, FIG. 2b, FIG. 3 and FIG. 4. The reference numerals identify the following components:
100 gate system
101 (first) gate
102 (second) gate
103 camera
104 exemplary field of view of camera
105 moveable, e.g. sliding, gate door
106 moveable, e.g. sliding, gate door
107 moveable, e.g. sliding, gate door
108 moveable, e.g. sliding, gate door
109 exemplary movement of a moveable gate door
110 fixed separator, separator walls, e.g. fixed separator anchored to ground
111 fixed separator, separator walls, e.g. fixed separator anchored to ground
112 fixed separators, separator walls, e.g. fixed separator anchored to gate enclosure
113 fixed separators, separator walls, e.g. fixed separator anchored to gate enclosure 114 fixed separators, separator walls, e.g. fixed separator anchored to gate enclosure
115 enclosure, e.g. gate enclosure
116 enclosure, e.g. gate enclosure
117 enclosure, e.g. gate enclosure
118 floor
119 reference
120 reference
121 reference
122 reference
123 reference
124 reference
125 reference
126 reference
127 reference
128 reference
129 exemplary (main) direction of movement of subjects and/or objects passing a gate
130 exemplary (main) direction of movement of subjects and/or objects passing a gate
131 lateral wall/side of gate enclosure
132 lateral wall/side of gate enclosure
133 public/free area
134 restricted area, e.g. area that requires an authorization/ticket
135 gate system control zone
136 edge part of a gate, for example, edge of fixed separator, possible reference
137 edge part of a gate, for example, edge of fixed separator, possible reference
200 scenario or event configuration, wherein a subject passes in front of a reference of a gate or gate system
201 subject or object
202 reference
203 camera
204 part or fraction of reference that is occulted by a subject or object, as seen from the perspective of a camera
205 exemplary (main) direction of movement of subjects and/or objects passing a gate
206 field of view of camera
300 time series of image frames, part of a video stream
301 exemplary image frame
302 exemplary image frame
303 exemplary image frame
304 subject
305 reference
306 part or fraction of reference that is occulted by a subject or object, as seen from the perspective of a/the camera
307 part or fraction of reference that is occulted by a subject or object, as seen from the perspective of a/the camera
308 part or fraction of reference that is occulted by a subject or object, as seen from the perspective of a/the camera
309 point in time, time stamp of image frame
310 point in time, time stamp of image frame
311 point in time, time stamp of image frame
400 time series
401 measurements, exemplary occultation measurements
402 curve, occultation curve
403 X-axis, for example time axis or image frame number axis
404 Y-axis, for example for measuring occultation, a measure for quantifying the degree or level or amount of occultation of a reference or a plurality of references by a subject or object
405 graph
406 distance, time distance, time interval
407 peak, maxima
408 peak, maxima
409 full width at half maximum
410 full width at half maximum
411 origin
412 (maximal) occultation value, for example, marking the case where the reference or a plurality of references is completely/entirely occulted by a subject and/or object
413 time of peak 408, exemplary time indicator of the time instant when a (first) subject/object is passing
414 occultation point on rising part of peak 408
415 occultation value at peak 408, height h of peak 408
416 fraction of height h of peak 408, for example defined by h/c, wherein c is a constant
417 occultation value of occultation point 414 on rising part of peak 408 at (h-h/c) height
418 projection of occultation point 414 on rising part of peak 408 onto X-axis, for example, as alternative indicator of the time instant when a (first) subject/object is passing
500 examples of occultation curves
501 example of measured occultation curve indicating a non-legal pass
502 further example of measured occultation curve indicating a non-legal pass
503 further example of measured occultation curve indicating a non-Legal pass
504 example of measured occultation curve indicating a legal pass
505 further example of measured occultation curve indicating a legal pass
506 example of measured occultation curve indicating an ambiguous pass
507 Y-axis, for example for measuring occultation, a measure for quantifying the degree or level or amount of occultation of a reference or a plurality of references by a subject or object
508 X-axis, for example time axis or image frame number axis
509 exemplary predefined (minimum) time interval between passes of two consecutive subjects/objects to the passes as legal
510 (maximal) occultation value, for example, marking the case where the reference or a plurality of references is completely/entirely occulted by a subject and/or object
511 peak or maxima
512 peak or maxima
513 peak or maxima
514 peak or maxima
515 peak or maxima
516 peak or maxima
517 peak or maxima
518 peak or maxima
519 peak or maxima
520 peak or maxima

What is claimed is:

1. Method for detecting tailgating of subjects and/or objects at gates comprising:
measuring the occultation of at least one reference occulted by at least one subject and/or at least one object passing through at least one gate, wherein the measuring is carried out by at least one detector configured for capturing single image frames and/or a stream of image frames,
generating at least one time series based on the measured occultation, wherein said generating comprises generating a curve representing a relation of amount of occultation of the at least one reference in dependence of time, determining at least one parameter from the generated curve for characterization of the at least one subject and/or at least one object passing through at least one gate for detecting fraudulent access.

2. Method according to claim 1, wherein a fixed or moveable part of a gate and/or a part of a gate environment is used as the at least one reference.

3. Method according to claim 1, wherein the at least one reference is attached to a fixed or moveable part of a gate and/or attached to a part of a gate environment.

4. Method according to claim 1, wherein at least one edge part of a gate is used as the at least one reference and/or wherein the at least one reference is attached to an edge part of a gate.

5. Method according to claim 1, wherein the determining of the at least one parameter from the at least one generated time series for characterization of the at least one subject and/or at least one object passing through at least one gate comprises determining at least one of:

a count for the number of subjects and/or objects passing the gate, a profile of a passing subject and/or object, a passing speed of a passing subject and/or object, a spatial extent in one or more spatial dimensions of a passing subject and/or object, a spatial volume and/or spatial proportions of a passing subject and/or object, a time interval, e.g. the time interval of the lapse of time between two consecutive subjects and/or objects passing the at least one gate.

6. Method according to claim 1, further comprising:

determining whether the at least one parameter determined from the at least one generated time series for characterization of the at least one subject and/or at least one object passing through at least one gate is within a value range and/or above or below a predetermined threshold value that qualifies the pass of the gate by the at least one subject and/or at least one object as a valid legal pass or as a fraudulent illegal pass.

7. Method according to claim 6, wherein the determining of whether the at least one parameter determined from the at least one generated time series for characterization of the at least one subject and/or at least one object passing through at least one gate lies within a predefined value range and/or above or below a predefined threshold value that qualifies the pass of the gate by the at least one subject and/or at least one object as a valid legal pass or as a fraudulent illegal pass, comprises:

evaluating whether a determined time interval of the lapse of time between two consecutive subjects and/or objects passing the at least one gate lies below a predetermined time interval for the at least one gate, and/or evaluating whether a determined passing speed of a passing subject and/or object, and/or whether a determined spatial extent in one or more spatial dimensions of a passing subject and/or object, and/or whether a determined spatial volume of a passing subject and/or object, lies within a predefined value range.

8. Method according to claim 6, wherein the predefined value range and/or the predefined threshold value for the at least one parameter from the at least one generated time series for characterization of the at least one subject and/or at least one object passing through at least one gate, is derived from an automatic machine learning procedure or is derived from human heuristic observations.

9. Method according to claim 1, wherein the step of determining at least one parameter from the at least one generated time series for characterization of the at least one subject and/or at least one object passing through at least one gate is based on carrying out the steps of measuring the occultation of at least one reference occulted by at least one subject and/or at least one object passing through at least one gate and generating at least one time series based on the measured occultation as part of training of a machine learning system.

10. One or more computer readable non-transitory storage media having stored therein instructions that, when executed by one or more processors, direct the one or more processors to perform a method for detecting tailgating of subjects and/or objects at gates comprising:

measuring the occultation of at least one reference occulted by at least one subject and/or at least one object passing through at least one gate, generating at least one time series based on the measured occultation, wherein said generating comprises generating a curve that represents a relation of amount of occultation of the at least one reference in dependence of time, and determining at least one parameter from the generated curve for characterization of the at least one subject and/or at least one object passing through at least one gate for detecting fraudulent access.

11. System for detecting tailgating of subjects and/or objects at gates comprising:

at least one detector, at least one reference, at least one digital data analysis unit, wherein said at least one detector is configured for measuring an occultation of said at least one reference occulted by at least one subject and/or at least one object passing through at least one gate, and wherein said at least one digital data analysis unit is configured for generating a time series based on the measured occultation, wherein said generating comprises generating a curve that represents a relation of amount of occultation of said at least one reference in dependence of time, and wherein said at least one digital data analysis unit is further configured for determining at least one parameter from the generated time series for characterization of the at least one subject and/or at least one object passing through the at least one gate for detecting fraudulent access.

12. System according to claim 11 comprising only a single detector.

13. System according to claim 11, wherein said at least one detector is arranged such, that said at least one detector's line of sight is not parallel to a main direction of a movement of the at least one subject and/or the at least one object when passing the at least one gate, and wherein preferably said at least one detector's line of sight is also not parallel to the direction of gravity.

14. System according to claim 11 further comprising a data transmission unit for transmitting data from said at least one digital data analysis unit to a central data analysis unit and/or to a mobile data analysis unit.

* * * * *